United States Patent
Kim et al.

(10) Patent No.: US 9,262,051 B2
(45) Date of Patent: Feb. 16, 2016

(54) METHOD AND APPARATUS FOR DISPLAYING POP-UP

(75) Inventors: Kwan Su Kim, Suwon-si (KR); Jeong Hyo Yi, Suwon-si (KR); Kwang Hyeon Lee, Gumi-si (KR); Hyun Ju Sung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 241 days.

(21) Appl. No.: 12/927,996

(22) Filed: Dec. 1, 2010

(65) Prior Publication Data

US 2011/0131527 A1    Jun. 2, 2011

(30) Foreign Application Priority Data

Dec. 1, 2009  (KR) .......................... 10-2009-0117490

(51) Int. Cl.
| | | |
|---|---|---|
| *H04N 1/00* | (2006.01) | |
| *G06F 3/0482* | (2013.01) | |
| *G06F 3/0481* | (2013.01) | |
| *G06F 9/44* | (2006.01) | |

(52) U.S. Cl.
CPC ............ *G06F 3/0482* (2013.01); *G06F 3/0481* (2013.01); *G06F 9/4443* (2013.01)

(58) Field of Classification Search
CPC ..................... G06F 2203/04803; G06F 3/0481; G06F 3/0482; G06F 3/04886; G06F 1/1626; G06F 9/4443; G06Q 20/322; G06Q 30/0277; G09B 19/02; G09G 5/14; H04M 1/27455; H04M 1/72547; H04M 1/72552; H04N 1/00472
USPC .................. 715/759, 783, 788, 792, 804, 808
See application file for complete search history.

(56) References Cited

U.S. PATENT DOCUMENTS

| | | | | |
|---|---|---|---|---|
| 6,523,022 | B1 * | 2/2003 | Hobbs ............... | G06F 17/30637 |
| 6,981,224 | B1 * | 12/2005 | Gardner et al. ............... | 715/760 |
| 7,296,230 | B2 | 11/2007 | Fukatsu et al. | |
| 8,667,417 | B1 * | 3/2014 | Goodger et al. .............. | 715/808 |
| 2004/0141016 | A1 | 7/2004 | Fukatsu et al. | |
| 2004/0239812 | A1 * | 12/2004 | Park .................... | H04N 5/44591 348/588 |
| 2006/0095860 | A1 | 5/2006 | Wada et al. | |
| 2007/0024913 | A1 | 2/2007 | Jeong | |
| 2007/0054661 | A1 * | 3/2007 | Park ...................... | H04M 1/576 455/418 |
| 2007/0162866 | A1 * | 7/2007 | Matthews ............. | G06F 3/0481 715/769 |
| 2007/0198948 | A1 * | 8/2007 | Toriyama .............. | A63F 13/005 715/790 |
| 2008/0115080 | A1 | 5/2008 | Matulic | |
| 2008/0196068 | A1 * | 8/2008 | Tseng .................. | H04N 5/4403 725/62 |
| 2009/0210820 | A1 * | 8/2009 | Adachi ................. | G06F 3/0481 715/786 |
| 2010/0031136 | A1 * | 2/2010 | Chen .................. | G06Q 30/0269 715/234 |
| 2010/0057854 | A1 * | 3/2010 | Chinnam ............... | G06Q 10/10 709/206 |
| 2010/0100842 | A1 * | 4/2010 | Kim .............................. | 715/808 |
| 2011/0175930 | A1 * | 7/2011 | Hwang ................. | G06F 3/0481 345/629 |
| 2012/0062688 | A1 * | 3/2012 | Shen ...................... | H04N 7/147 348/14.03 |
| 2012/0293543 | A1 * | 11/2012 | Jardine-Skinner .... | G06F 3/1454 345/619 |

FOREIGN PATENT DOCUMENTS

| | | |
|---|---|---|
| CN | 1905001 | 1/2007 |
| CN | 101131619 | 2/2008 |
| CN | 101178725 | 5/2008 |
| CN | 101183396 | 5/2008 |
| JP | H06282400 A | 10/1994 |
| JP | 2005032041 A | 2/2005 |
| JP | 2007207193 A | 8/2007 |

OTHER PUBLICATIONS

Office Action dated Nov. 4, 2014 in connection with Japanese Patent Application No. 2010-268450; 6 pages.

* cited by examiner

*Primary Examiner* — Shen Shiau

(57) ABSTRACT

A pop-up display method and apparatus allows a user to selectively check a desired pop-up in a convenient manner. A screen is divided into a main page display portion and a pop-up display portion. A web page is displayed in the main page display portion, and a pop-up corresponding to the web page is displayed in the pop-up display portion. A preview image or short text of the pop-up may be extracted and displayed.

15 Claims, 12 Drawing Sheets

FIG. 11
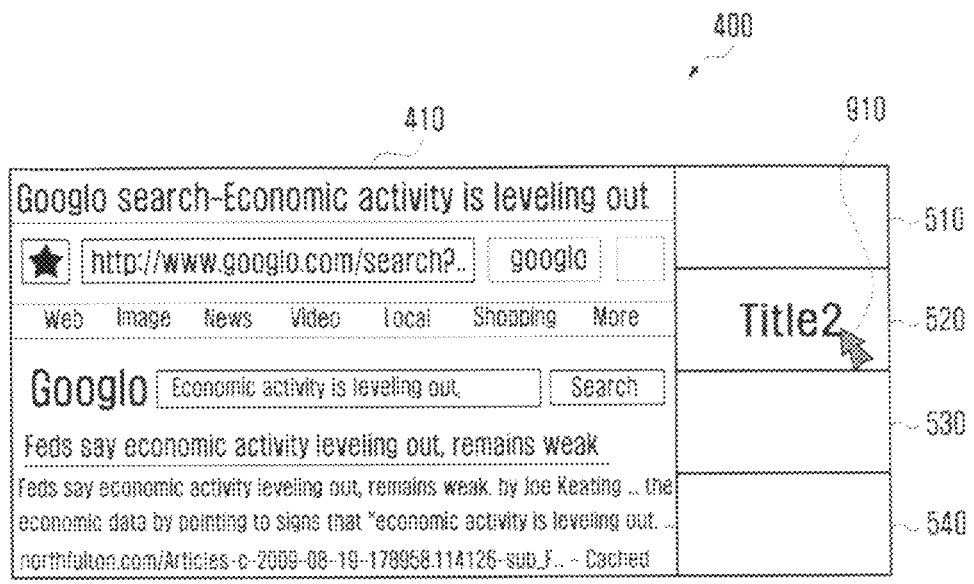
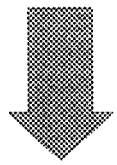
Click
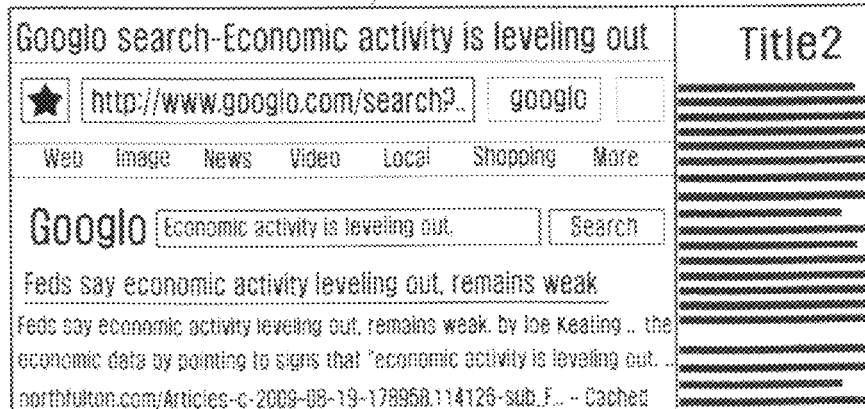

FIG. 12
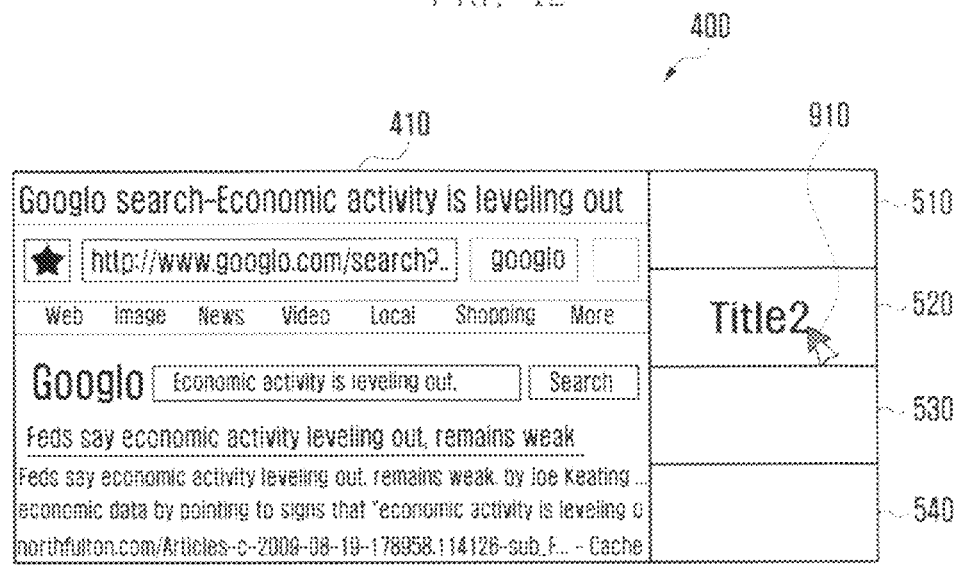
Click
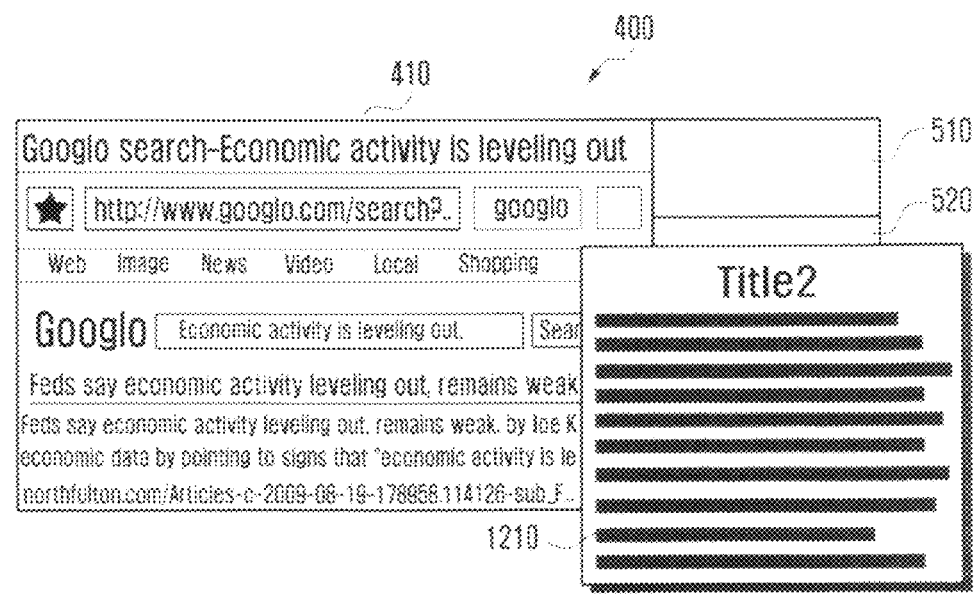

METHOD AND APPARATUS FOR DISPLAYING POP-UP

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Dec. 1, 2009 and assigned Serial No. 10-2009-0117490, the entire disclosure of which is hereby incorporated by reference.

TECHNICAL FIELD OF THE INVENTION

The present invention relates in general to pop-up display technology and, more particularly, to a method and apparatus for displaying a pop-up and thus allowing a user to selectively check a desired pop-up in a convenient manner.

BACKGROUND OF THE INVENTION

In computers, a pop-up window refers to a small area that emerges quickly into a screen in response to a specific event. A variety of applications, especially a web browser, provides the pop-up interface. Normally a pop-up window is displayed when a user clicks a particular item or link, or in response to a particular operation of a keyboard.

If there is any pop-up window designed to be automatically displayed when a web page is loaded by a web browser, such a pop-up window linked to that web page is displayed regardless of a user's preference. This may cause undesirable occupation of a resource and screen, thereby causing discontent among users.

In order to solve the above problem, web browsers today almost use a function that automatically blocks pop-up windows. This may, however, give rise to another problem such that even desired or necessary pop-up windows are also blocked.

SUMMARY OF THE INVENTION

To address the above-discussed deficiencies of the prior art, it is a primary object to provide a pop-up display method and apparatus in which a user is allowed to selectively check a desired pop-up in a convenient manner.

Another aspect of the present invention is to provide a pop-up display method and apparatus in which resources are effectively used by preventing too many pop-up windows from emerging.

According to one aspect of the present invention, a method for displaying a pop-up is provided. The method includes dividing a screen into a main page display portion and a pop-up display portion. A web page is displayed in the main page display portion. A pop-up corresponding to the web page is displayed in the pop-up display portion.

According to another aspect of the present invention, provided is an apparatus for displaying a pop-up. The apparatus includes a display unit configured to display a web page and a pop-up. A control unit divides a screen into a main page display portion and a pop-up display portion, controls the display unit to display the web page in the main page display portion, and controls the display unit to display the pop-up corresponding to the web page in the pop-up display portion.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 exemplary a subsequent function in response to a specific event in accordance with an embodiment of the present invention; and FIG. 12 exemplary a subsequent function in response to a specific event in accordance with an embodiment of the present invention.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computer. Rather, the disclosed embodiments are provided such that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent certain embodiments of the invention, the drawings are not necessarily to scale, and certain features may be exaggerated or omitted in order to better illustrate and explain the present invention.

Figure 1:
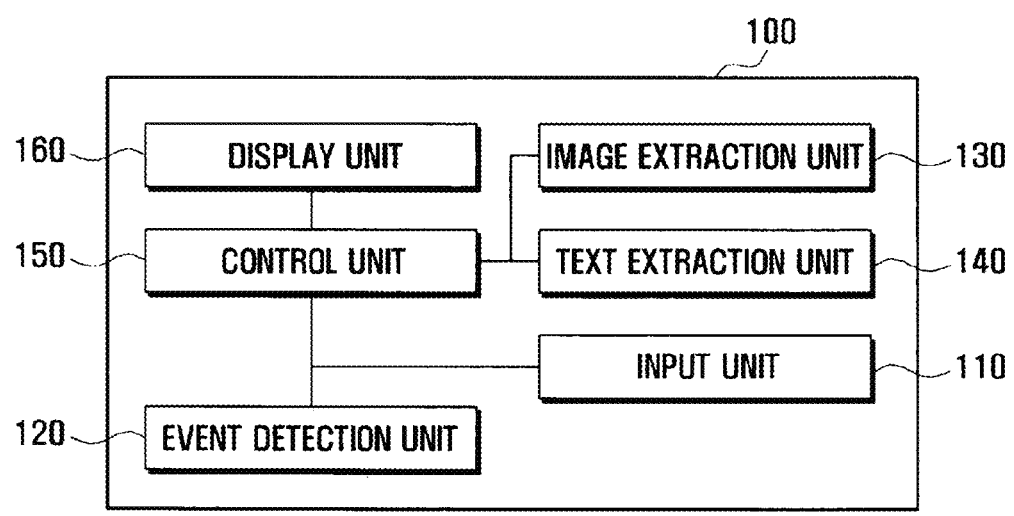
FIG. 1 illustrates the configuration of a pop-up display apparatus in accordance with an embodiment of the present invention.

FIG. 1 illustrates the configuration of a pop-up display apparatus in accordance with an embodiment of the present invention.

Referring to FIG. 1, the pop-up display apparatus 100 includes an input unit 110, an event detection unit 120, an image extraction unit 130, a text extraction unit 140, a control unit 150, and a display unit 160.

The input unit 110 receives a user's input action and sends a corresponding input signal to the event detection unit 120 and the control unit 150. The input unit 110 may be formed of at least one of a keyboard, a mouse, a track ball, a touch pad, a keypad, a touch screen, and so forth, that can process a user's input action.

The event detection unit 120 receives and analyzes an input signal, and if a predefined event is detected as the result of analysis, sends information about the detected event to the control unit 150. The control unit 150 controls the display unit 150 to display a screen according to the event information.

The image extraction unit 130 extracts a preview image of a pop-up corresponding to a web page when the web page is loaded. In an embodiment, the preview image may assist a user in guessing the contents of the pop-up.

The text extraction unit 140 extracts short text of a pop-up corresponding to a web page when the web page is loaded. In an embodiment, the short text may assist a user in guessing the contents of the pop-up.

The control unit 150 controls the display unit 160 to display a web page and a pop-up. In an embodiment, if the number of pop-ups corresponding to the web page is greater than a given value for a screen division when the web page is loaded, the control unit 150 divides a screen into a main page display portion and a pop-up display portion. The control unit 150 also controls the display unit 160 to display the web page in the main page display portion and also display the pop-up corresponding to the web page in the pop-up display portion. Additionally, the control unit 150 controls the display unit 160 to display a preview image and/or short text of the pop-up in the pop-up display portion. If a specific event assigned in advance to the pop-up displayed in the pop-up display portion occurs, the control unit 150 controls the display unit 160 to display the preview image or short text, to display the pop-up itself in an extended display form, or to display the pop-up in the form of a pop-up window.

As discussed above, the display unit 160 displays the web page and the pop-up under the control of the control unit 150.

A related operation in the above respective elements of the pop-up display apparatus 100 will be described in detail.

Figure 2:
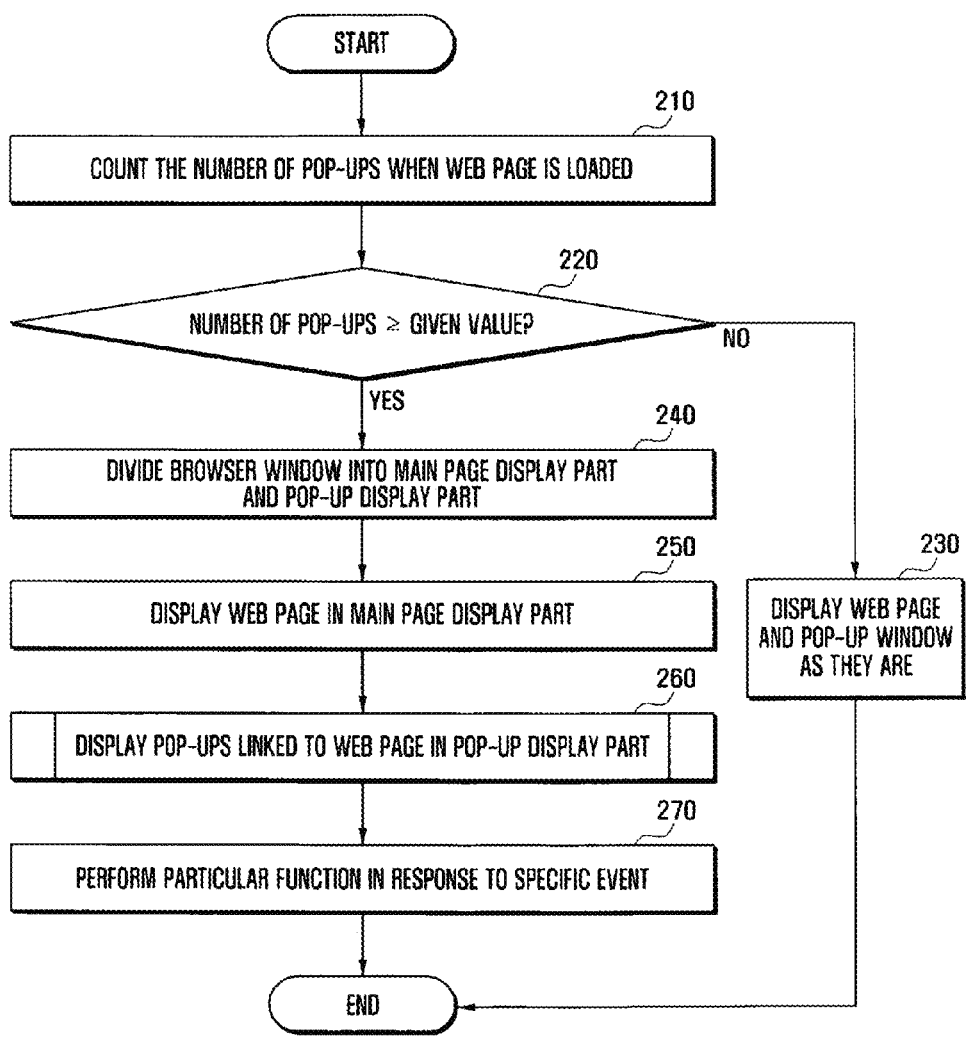
FIG. 2 illustrates a pop-up display method in accordance with an embodiment of the present invention.

FIG. 2 illustrates a pop-up display method in accordance with an embodiment of the present invention.

Referring to FIGS. 1 and 2, in block 210, the control unit 150 counts the number of pop-ups corresponding to a web page when the web page is loaded. Here, the pop-up corresponding to the web page refers to a pop-up linked to the web page so as to be automatically generated through the JavaScript™ window.open method or any equivalent when the web page is loaded. JavaScript™ is a trademark owned by Oracle America, Inc. For instance, if an index.aspx file to be loaded by a browser includes the following JavaScript™ syntax to be executed, a popup/pop_091030.html page is displayed in the form of pop-up window when the index.aspx file is loaded.

window.open('popup/pop_091030.html', 'pop_091030','height=670, width=479,left=0,top=0,location=0, menubar=0,resizable=0,scrollbars=0, status=0,titlebar=0, toolbar=0');

Therefore, when a selected web page is loaded as discussed above, the control unit 150 counts the number of pop-ups recorded in the web page so as to be automatically displayed.

Next, in block 220, the control unit 150 determines whether the number of pop-ups corresponding to the web page ready for loading is equal to or greater than a given value for a screen division. Here, the given value for a screen division may be set by a user, a hardware provider, or a software provider. If the number (e.g., two) of pop-ups corresponding to the web page to be loaded is smaller than the given value (e.g., three) for a screen division, the control unit 150 performs block 230. If the number (e.g., four) of pop-ups corresponding to the web page to be loaded is equal to or greater than the given value (e.g., three) for a screen division, the control unit 150 performs block 240.

Although this embodiment shown in FIG. 2 uses the comparison of the given value for a screen division and the number of pop-ups corresponding to the web page in order to determine whether to divide the screen, this is merely an example and not to be considered as a limitation of this invention. Alternatively, the division of the screen may be determined based on whether the address of a pop-up page is the same as that of the web page to be loaded. Additionally, the screen may be divided in response to a user's input from a predefined shortcut key. The following description will be based on a current embodiment shown in FIG. 2.

Figure 3:
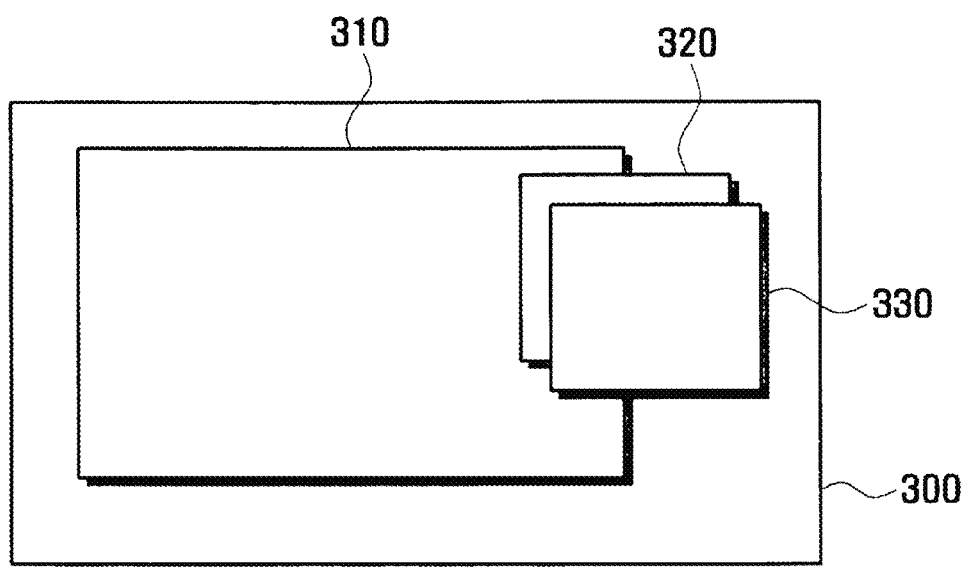
FIG. 3 illustrates a sample screen displayed in block 230 of FIG. 2, in accordance with an embodiment of the present invention.

FIG. 3 illustrates an example screen displayed in block 230 of FIG. 2, according to an embodiment of the present invention.

In block 230, the pop-up display apparatus 100 displays a pop-up window as well as the web page to be loaded, just as they are.

Referring to FIGS. 2 and 3, the web page is loaded in a browser window 310 on the display unit 300. Here, the number of pop-ups corresponding to the loaded web page is two, whereas the given value for a screen division is three. Because the number of pop-ups is relatively smaller, all the pop-ups linked to the current web page are displayed in respective pop-up windows 320 and 330. In an embodiment, such pop-up windows 320 and 330 may be blocked.

Figure 4:
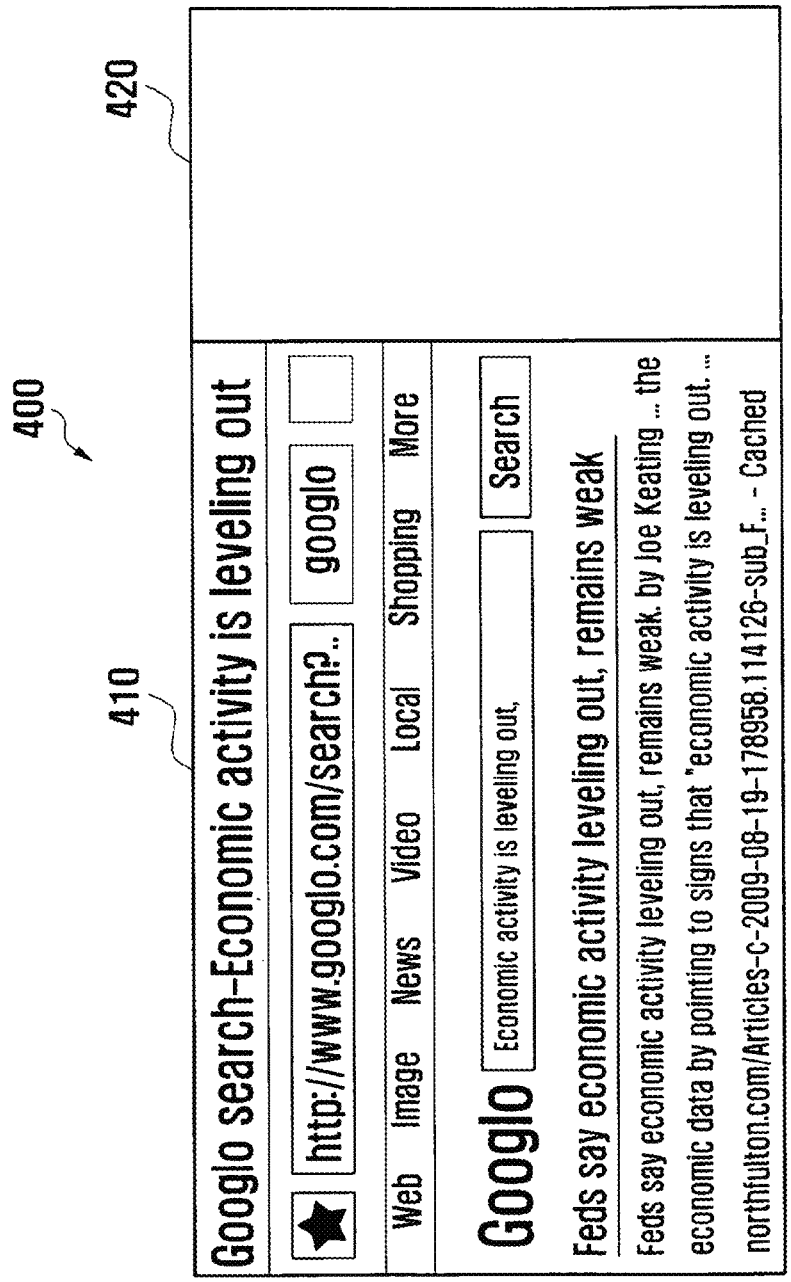
FIG. 4 illustrates the division of a screen in block 240 of FIG. 2, in accordance with an embodiment of the present invention.

FIG. 4 illustrates the division of a screen in block 240 of FIG. 2, in accordance with an embodiment of the present invention.

Referring to FIGS. 1, 2, and 4, in block 240, the control unit 150 divides a screen 400 (e.g., a browser window) into a main page display portion 410 and a pop-up display portion 420. The main page display portion 410 is a portion in which the web page to be loaded will be displayed, and the pop-up display portion 420 is a portion in which the pop-ups corresponding to the web page will be displayed. In block 250, the selected web page is displayed in the main page display portion 410. Additionally, in block 260, the pop-up corresponding to the web page is displayed in the pop-up display portion 420.

Figure 5:
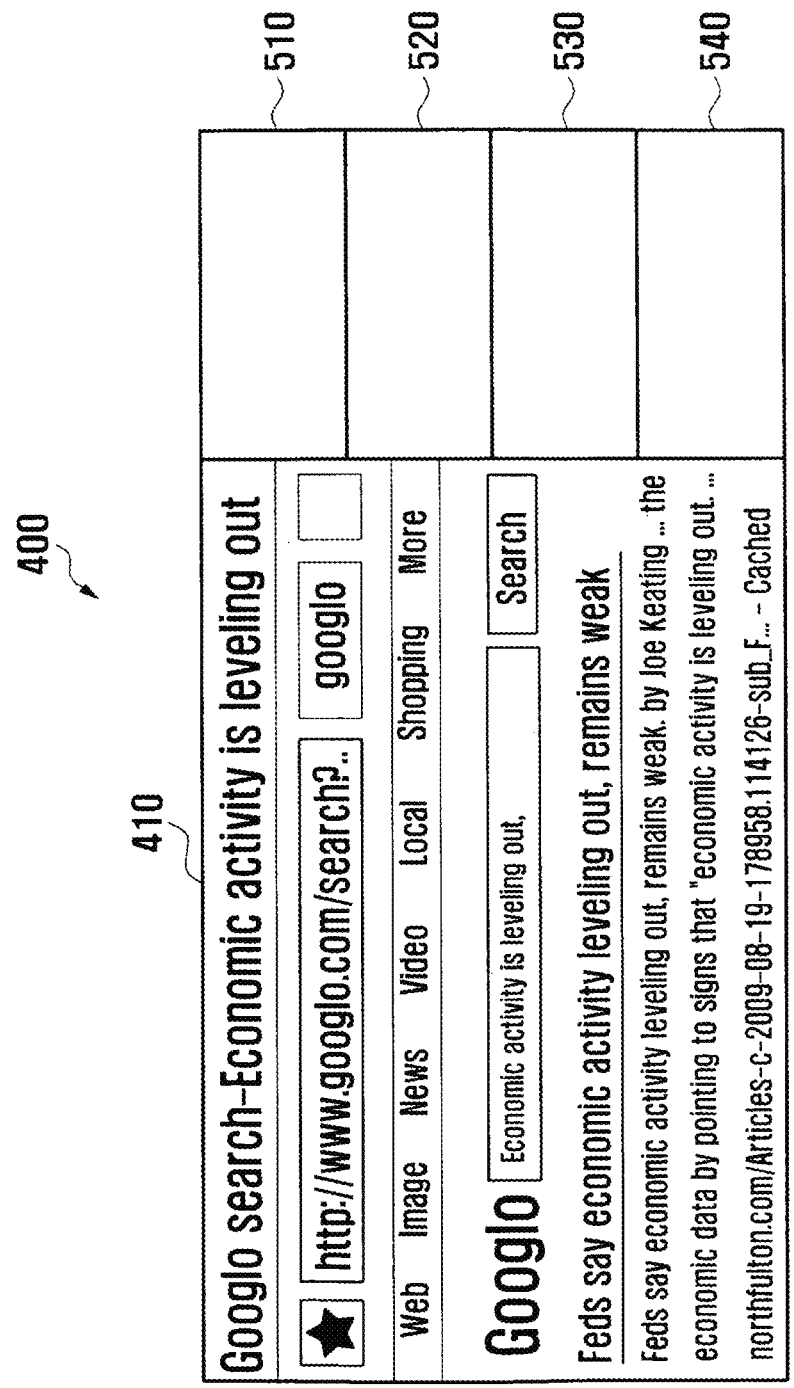
FIG. 5 illustrates a divided screen to which a pop-up display method is applied in accordance with an embodiment of the present invention.

FIG. 5 illustrates a divided screen to which a pop-up display method is applied in accordance with an embodiment of the present invention.

Referring to FIGS. 1, 2, 4 and 5, in the divided screen 400 (e.g., a browser window), the main page display portion 410 displays a web page. If the number of pop-ups linked to the displayed web page is four, the pop-up display portion 420 displays four pop-ups 510, 520, 530 and 540. Namely, the control unit 150 controls the display unit 160 such that the main page display portion 410 may display the web page and such that the pop-up display portion 420 may display the four pop-ups 510, 520, 530 and 540. Therefore, the display unit 160 displays the web page and the pop-ups under the control of the control unit 150. The pop-ups 510, 520, 530 and 540 displayed in the pop-up display portion 420 may take the form of rendering a source of each pop-up page without being changed. Namely, respective separate pop-up pages may be displayed in the pop-up display portion 420. This may advantageously save resources as there is no need to generate additional windows for pop-up, and also may display pop-up pages at specific positions and sizes determined by a user. In an embodiment, the pop-ups 510, 520, 530 and 540 displayed in the pop-up display portion 420 may take the form of preview images or the form of short text as discussed below.

Figure 6:
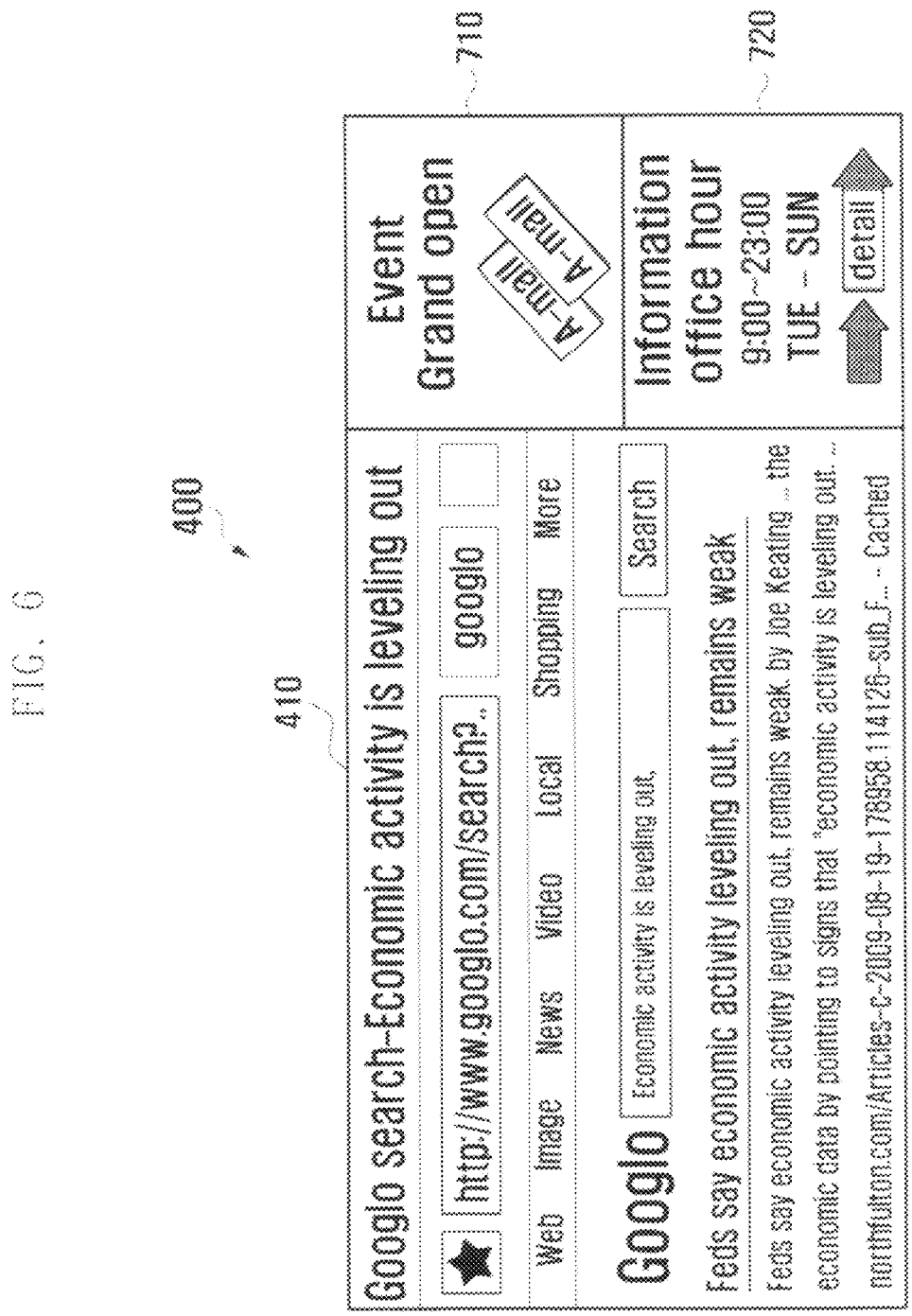
FIG. 6 illustrates pop-ups displayed in the form of a preview image in the divided screen of FIG. 5, in accordance with an embodiment of the present invention.

FIG. 6 is an example view illustrating pop-ups displayed in the form of a preview image in the divided screen of FIG. 5, in accordance with an embodiment of the present invention.

Referring to FIGS. 1, 4 and 6, when the pop-ups are displayed in the form of preview images, the image extraction unit 130 extracts preview images 710 and 720 of respective pop-ups corresponding to the web page being loaded. Such a preview image is a converted image with a reduced size of a portion or the whole of a screen offered to a user when a pop-up page source is rendered. The size of the preview image depends on the size of the pop-up display portion 420 occupied by the pop-ups. When the preview images 710 and 720 are extracted, the control unit 150 controls the display unit 160 such that the preview images 710 and 720 of the respective pop-ups can be displayed in the pop-up display portion 420. Therefore, the display unit 160 displays the preview images 710 and 720 of the respective pop-ups in the pop-up display portion 420 under the control of the control unit 150.

Figure 7:
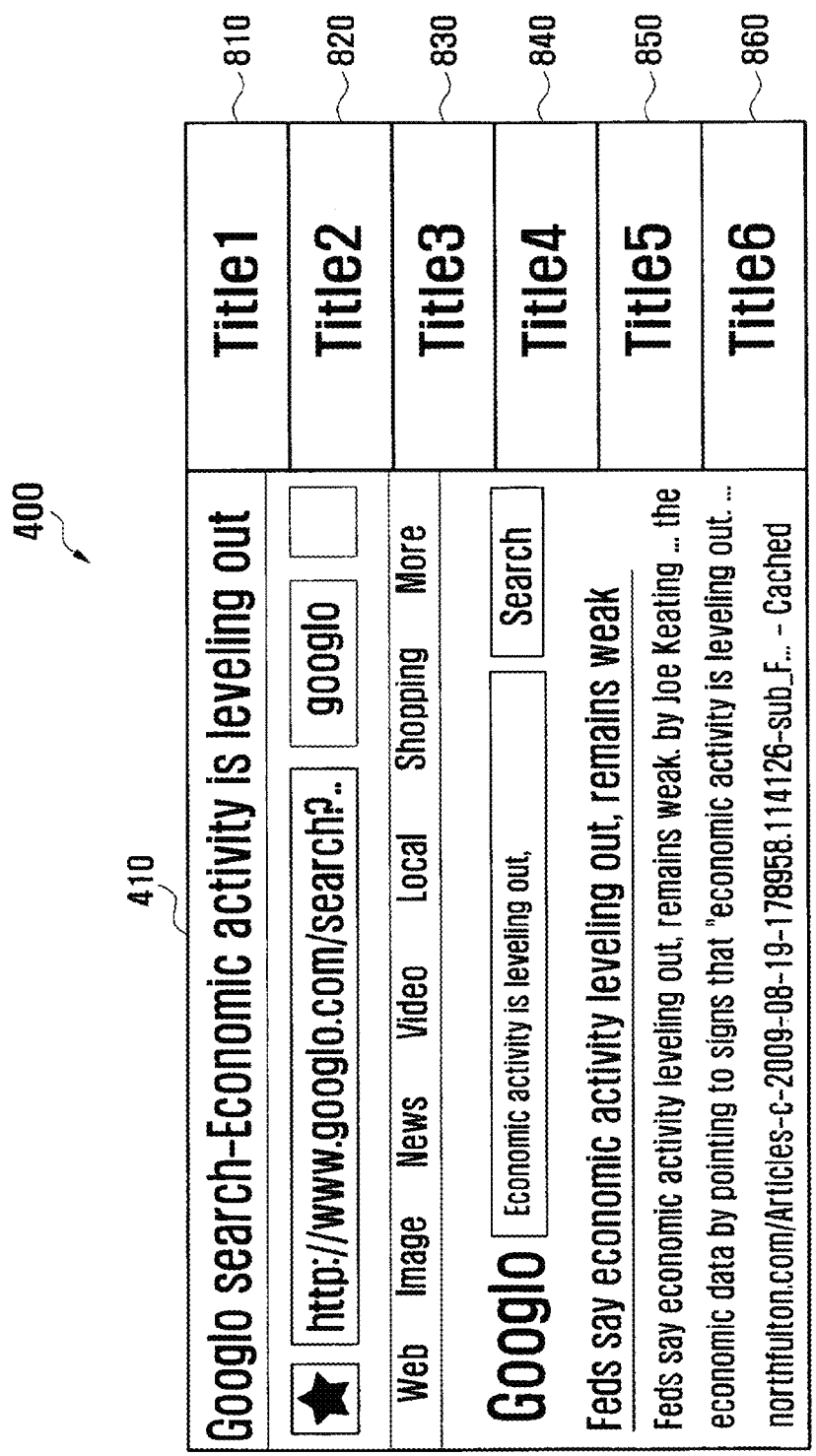
FIG. 7 illustrates pop-ups displayed in the form of short text in the divided screen of FIG. 5, in accordance with an embodiment of the present invention.

FIG. 7 illustrates pop-ups displayed in the form of short text in the divided screen of FIG. 5, in accordance with an embodiment of the present invention.

Referring to FIGS. 1, 4 and 7, when the pop-ups are displayed in the form of short text, the text extraction unit 140 extracts short texts 810, 820, 830, 840, 850 and 860 of respective pop-ups corresponding to the web page being loaded. Such short text may be, for example, a portion corresponding to the title tag of an html source. Alternatively, any other portion considered as important text by analyzing a web page source may be used as the short text, including text with a relatively larger font size, text being present at the header, text in bold type, in italics, or underlined, and the like. When the short texts 810 to 860 are extracted, the control unit 150 controls the display unit 160 such that the short texts 810 to 860 of the respective pop-ups can be displayed in the pop-up display portion 420. Therefore, the display unit 160 displays the short text 810 to 860 of the respective pop-ups in the pop-up display portion 420 under the control of the control unit 150.

Figure 8:
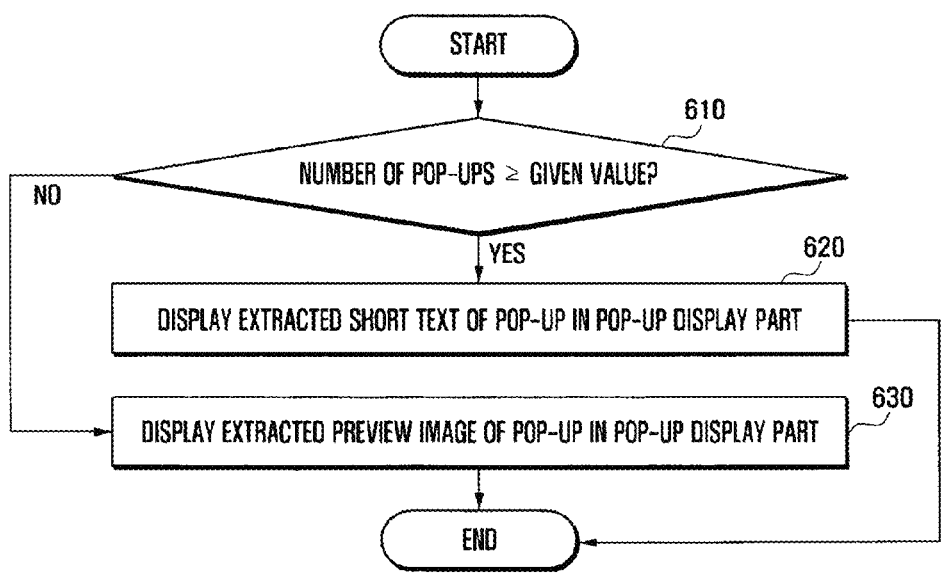
FIG. 8 illustrates a process of displaying pop-ups in the form of a preview image or short text depending on the number of pop-ups in accordance with an embodiment of the present invention.

FIG. 8 illustrates a process of displaying pop-ups in the form of a preview image or short text depending on the number of pop-ups in accordance with an embodiment of the present invention.

Referring to FIGS. 1, 4, 6, 7 and 8, in block 610, the control unit 150 determines whether the number of pop-ups is equal to or greater than a given value for a short text display. This value for a short text display is used for determining whether to display the pop-ups in the form of short text or in the form of preview images. If the number (e.g., six) of pop-ups is equal to or greater than the given value (e.g., four) for a short text display, the control unit 150 performs block 620. If the number (e.g., two) of pop-ups is smaller than the given value (e.g., four) for a short text display, the control unit 150 performs block 630.

In block 620, the image extraction unit 130 extracts the preview images of the pop-ups linked to the web page being loaded. As shown in FIG. 6, when the preview images 710 and 720 are extracted, the control unit 150 controls the display unit 160 such that the preview images 710 and 720 of the respective pop-ups can be displayed in the pop-up display portion 420. Therefore, the display unit 160 displays the preview images 710 and 720 of the respective pop-ups in the pop-up display portion 420 under the control of the control unit 150.

In block 630, the text extraction unit 140 extracts the short text of the pop-ups linked to the web page being loaded. As shown in FIG. 7, when the short texts 810 to 860 are extracted, the control unit 150 controls the display unit 160 such that the short texts 810 to 860 of the respective pop-ups can be displayed in the pop-up display portion 420. Therefore, the display unit 160 displays the short texts 810 to 860 of the respective pop-ups in the pop-up display portion 420 under the control of the control unit 150. If there are too many pop-ups, resources may be consumed excessively to load and display the preview images of all pop-ups. Therefore, with relatively many pop-ups, it may be desirable to display the pop-ups in the form of short text.

According to an embodiment shown in FIG. 8, when there are relatively few pop-ups, a preview image display manner is adopted to assist in guessing the contents of the pop-ups. Alternatively, when there are relatively many pop-ups, a short text display manner is adopted to make better use of the pop-up display portion 420 with a limited size and thus to save resources.

The preview image display manner and the short text display manner may be used alone or in combination, depending on a setting by a user, a hardware provider, or a software provider.

Returning to FIG. 2, in block 270, the pop-up display apparatus 100 detects a specific event for a selected pop-up and, performs a particular function. The event for pop-ups may include a mouse-on event, a click event, a double click event, a touch event, a drag and drop event, and an so forth, that may occur on a selected one of the pop-ups displayed in the pop-up display portion 420. Furthermore, the event for pop-ups may include a key input of a keypad or keyboard assigned to each pop-up displayed in the pop-up display portion 420.

Figure 9:
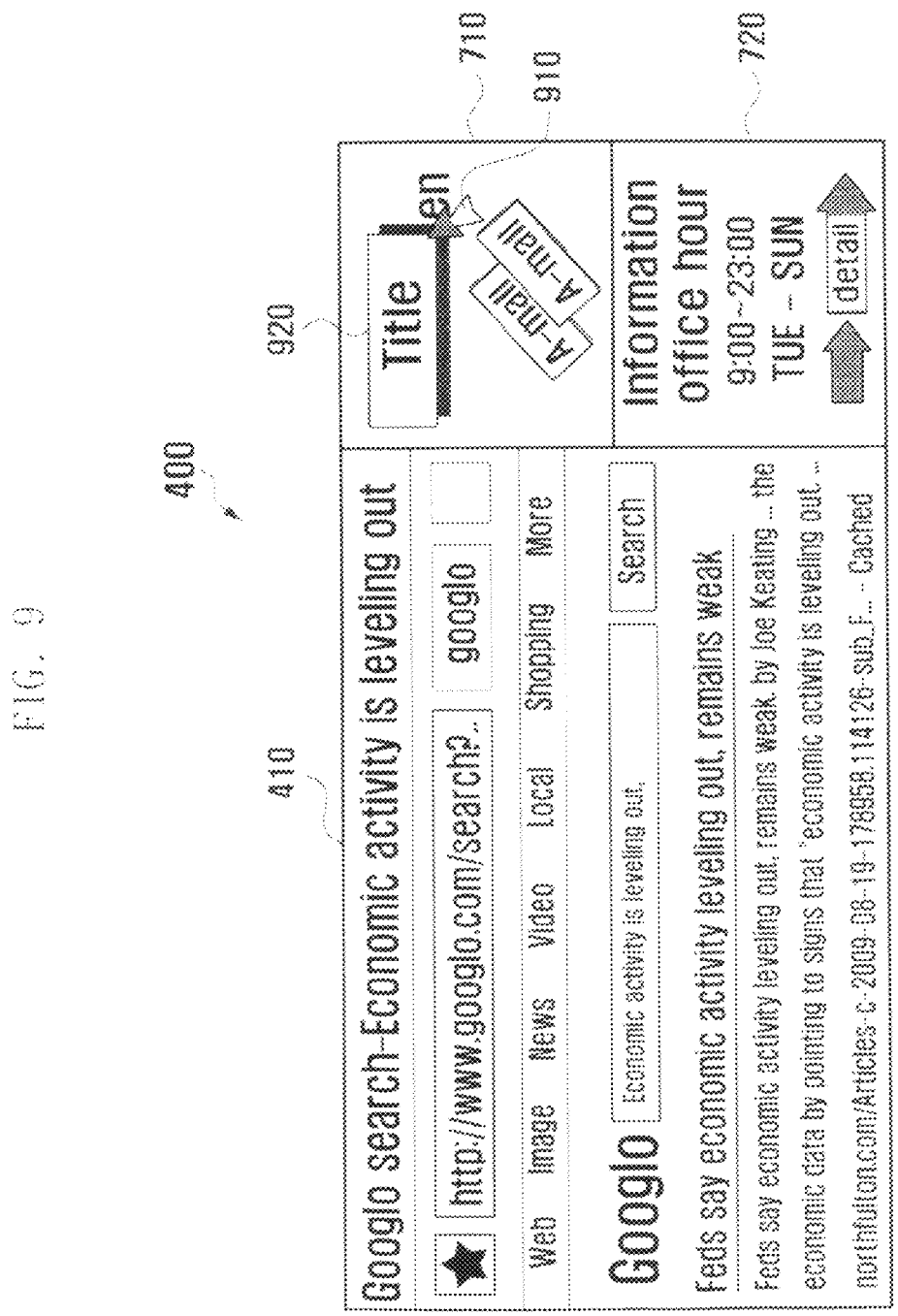
FIG. 9 illustrates a subsequent function in response to a specific event in accordance with an embodiment of the present invention.

FIG. 9 illustrates a subsequent function in response to a specific event in accordance with an embodiment of the present invention.

FIG. 9 shows an embodiment in which a mouse-on event occurs on the first pop-up 710 in the browser window 400. Here, the first and second pop-ups 710 and 720 are displayed in the form of preview images, as discussed with regard to FIG. 6. Referring to FIG. 9, when a mouse cursor 910 is moved onto the first pop-up 710, the short text 920 of the first pop-up 710 may emerge in the form of a tooltip. Specifically, the event detection unit 120 detects the mouse-on event and sends detected event information to the control unit 150. Then the control unit 150 receives event detection information and, based thereon, controls the display unit 160 to display the short text 920 of the first pop-up 710 in the form of tooltip. Therefore, the display unit 160 displays the short text 920 under the control of the control unit 150. In an embodiment, when there is a certain preview image that makes it difficult to understand the contents of a pop-up, a user can move the mouse cursor 910 onto that preview image and refer to the short text 920. Therefore, this embodiment may allow a user to easily guess the contents of a selected pop-up.

Figure 10:
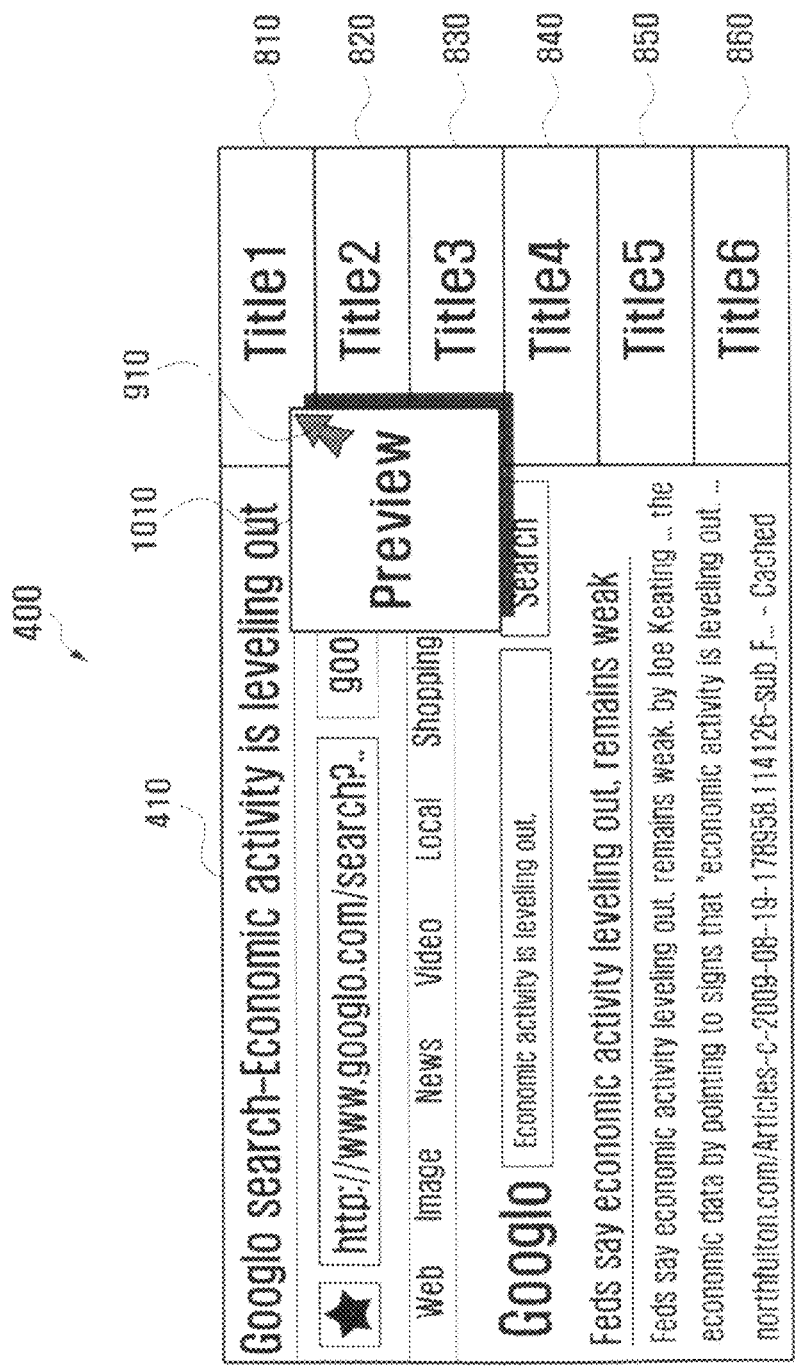
FIG. 10 illustrates a subsequent function in response to a specific event in accordance with an embodiment of the present invention.

FIG. 10 illustrates a subsequent function in response to a specific event in accordance with an embodiment of the present invention.

FIG. 10 shows another embodiment in which a mouse-on event occurs on the first pop-up 810 in the browser window 400. Here, six pop-ups 810 to 860 are displayed in the form of short text, as discussed in FIG. 7. Referring to FIG. 10, when the mouse cursor 910 is moved onto the first pop-up 810, the preview image 1010 of the first pop-up 810 may emerge in the form of an overlay. Specifically, the event detection unit 120 detects the mouse-on event and sends detected event information to the control unit 150. The control unit 150 receives the event detection information and, based thereon, controls the display unit 160 to display the preview image 1010 of the first pop-up 810. Therefore, the display unit 160 displays the preview image 1010 under the control of the control unit 150. In an embodiment, when there is certain short text that makes it difficult to understand the contents of a pop-up, a user can move the mouse cursor 910 onto that short text and further refer to the preview image 1010. Therefore, this embodiment may also allow a user to easily guess the contents of a selected pop-up.

Although the two examples shown in FIGS. 9 and 10 use subsequent functions related to the mouse-on event only, similar functions may be performed for any other event such as a click event, a double click event or a touch event, depending on a setting by a user, a hardware provider, or a software provider.

FIG. 11 illustrates a subsequent function in response to a specific event in accordance with an embodiment of the present invention.

Referring to FIG. 11, when a user clicks the second pop-up 520 displayed with short text 'Title2', the event detection unit 120 detects the mouse click event and sends detected event information to the control unit 150. The control unit 150 receives event detection information and, based thereon, controls the display unit 160 to display the second pop-up 520 in an extended display form. Therefore, the display unit 160 displays the second pop-up 520 in an increased display area. For example, the second pop-up 520 may occupy the entire pop-up display portion 420 as illustrated.

As such, the second pop-up 520 displayed with a limited size by adopting the preview image or short text display manner may be displayed in an increased display area in which a web page corresponding to the second pop-up 520 is rendered. Namely, the preview image or short text of the second pop-up 520 may be replaced by its web page. In an embodiment, a user may check the detailed contents of a pop-up by clicking on it. In another embodiment, the second pop-up 520 may still adopt the preview image display manner when being displayed in an increased display area. Nevertheless, this may also allow a user to check the detailed contents of a selected pop-up.

FIG. 12 illustrates a subsequent function in response to a specific event in accordance with an embodiment of the present invention.

Referring to FIG. 12, when a user clicks the second pop-up 520 displayed with short text 'Title2', the event detection unit 120 detects the mouse click event and sends detected event information to the control unit 150. The control unit 150 receives event detection information and, based thereon, controls the display unit 160 to display the second pop-up 520 in the form of a pop-up window 1210. Therefore, the display unit 160 displays the second pop-up 520 in the pop-up window 1210. As such, the second pop-up 520 displayed with a limited size by adopting the preview image or short text display manner may be displayed in the pop-up window 1210 in which a web page corresponding to the second pop-up 520 is rendered. Namely, the preview image or short text of the second pop-up 520 may be replaced by its web page. In this embodiment, a user can also check the detailed contents of a pop-up by clicking on it.

The above-described method according to the present invention can be executed according to computer program instructions. Because these program instructions can be included in a computer, in a special processor or in programmable or dedicated hardware, instructions executed therein may facilitate the implementation of the functions discussed above. As would be understood in the art, the computer, the processor or the programmable hardware include memory components that may store or receive software or computer code that when accessed and executed by the computer, processor or hardware implement the processing methods described in the present disclosure. In addition, it would be recognized that when a general purpose computer accesses code for implementing the processing shown herein, the execution of the code transforms a general purpose computer into a special purpose computer for executing the processing shown herein. The program instructions and the media may be those specially designed and constructed for the purposes of the present invention, or they may be of the kind well-known and available to those skilled in computer software.

The apparatus according to this invention may include, but is not limited to, a variety of portable electronic devices such as a mobile phone, a personal digital assistant (PDA), a smart phone, a portable multimedia player (PMP), a music player, a digital broadcasting receiver, a car navigation system, and such.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for displaying a pop-up, the method comprising:

dividing, when a pop-up corresponding to a web page exists, a screen into a main page display portion and a pop-up display portion in response to loading the web page;

displaying the web page in the main page display portion; and displaying the pop-up corresponding to the web page in the pop-up display portion, wherein displaying the pop-up comprises:

comparing a number of pop-ups corresponding to the webpage with a given value that is equal to or greater than 2;

extracting and displaying a first preview including a portion of contents of the pop-up in the pop-up display portion if the number of pop-ups corresponding to the web page is equal to or greater than the given value; and extracting and displaying a second preview including full contents of the pop-up in the pop-up display portion if the number of pop-ups corresponding to the web page is less than the given value.

2. The method of claim 1, wherein the screen is divided when the number of pop-ups corresponding to the web page is not less than a given value for a screen division.

3. The method of claim 1, wherein the second preview comprises:

a preview image of the pop-up.

4. The method of claim 1, wherein the first preview comprises:

a short text of the pop-up.

5. The method of claim 1, wherein displaying the pop-up comprises:

counting the number of pop-ups when the web page is loaded.

6. The method of claim 1, further comprising:

displaying the pop-up in an extended display form when a specific event assigned to the pop-up occurs.

7. The method of claim 1, further comprising:

displaying the pop-up in a new pop-up window when a specific event assigned to the pop-up occurs.

8. An apparatus for displaying a pop-up, the apparatus comprising:

a display unit configured to display a web page and a pop-up; and a control unit configured to divide, when a pop-up corresponding to the web page exists, a screen into a main page display portion and a pop-up display portion in response to loading the web page, control the display unit to display the web page in the main page display portion, and control the display unit to display the pop-up corresponding to the web page in the pop-up display portion, wherein the control unit is configured to control the display unit to:

compare a number of pop-ups corresponding to the web page with a given value that is equal to or greater than 2;

extract and display a first preview including a portion of contents of the pop-up in the pop-up display portion if the number of pop-ups corresponding to the web page is equal to or greater than the given value; and extract and display a second preview including full contents of the pop-up in the pop-up display portion if the number of pop-ups corresponding to the web page is less than the given value.

9. The apparatus of claim 8, wherein the control unit divides the screen when the number of pop-ups corresponding to the web page is not less than a given value for a screen division.

10. The apparatus of claim 8, further comprising:

an image extraction unit configured to extract the second preview, the second preview comprising a preview image of the pop-up.

11. The apparatus of claim 8, further comprising:

a text extraction unit configured to extract the first preview, the first preview comprising a short text of the pop-up.

12. The apparatus of claim 8, wherein the control unit is further configured to count the number of pop-ups when the web page is loaded.

13. The apparatus of claim 8, wherein the control unit is further configured to display the pop-up in an extended display form when a specific event assigned to the pop-up occurs.

14. The apparatus of claim 8, wherein the control unit is further configured to display the pop-up in a new pop-up window when a specific event assigned to the pop-up occurs.

15. A non-transitory computer readable medium comprising software for displaying a pop-up, the non-transitory computer readable medium comprising instructions for:

dividing, when a pop-up corresponding to a web page exists, a screen into a main page display portion and a pop-up display portion in response to loading the web page;

displaying the web page in the main page display portion; and displaying the pop-up corresponding to the web page in the pop-up display portion, wherein displaying the pop-up comprises:

comparing a number of pop-ups corresponding to the web page with a given value that is equal to or greater than 2;

extracting and displaying a first preview including a portion of contents of the pop-up in the pop-up display portion if the number of pop-ups corresponding web page is equal to or greater than the given value; and extracting and displaying a second preview including full contents of the pop-up in the pop-up display portion if the number of pop-ups corresponding to the web page is less than the given value.

* * * * *